Dec. 25, 1945.　　　R. F. BEEREND　　　2,391,767
BAKE PAN
Filed May 20, 1943　　　2 Sheets-Sheet 1
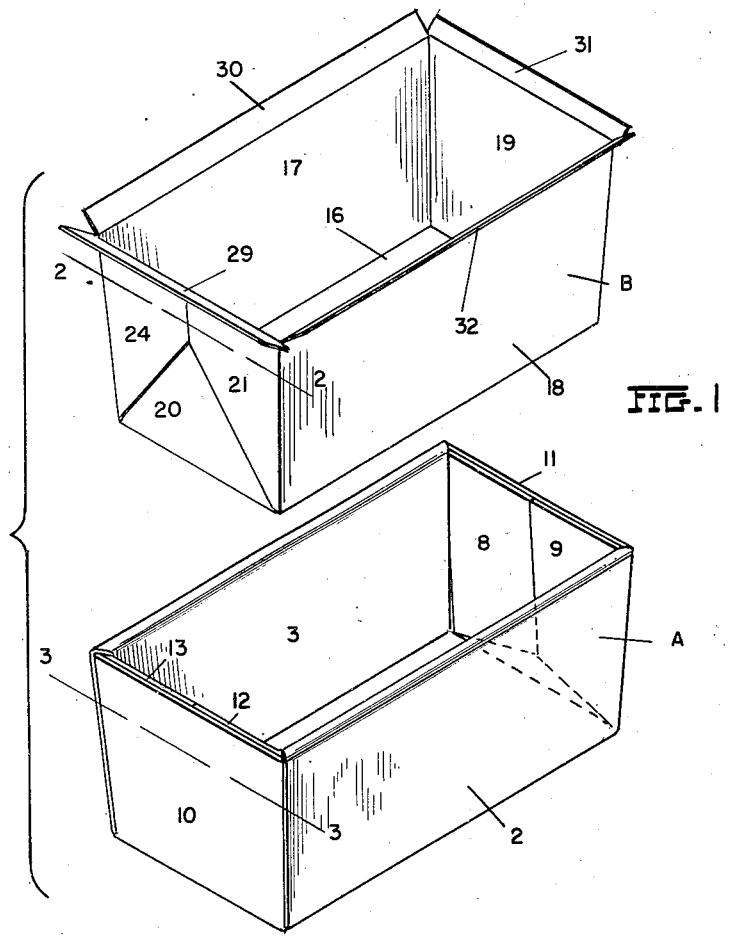
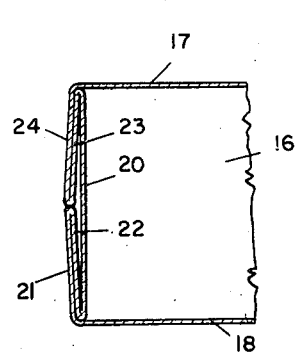
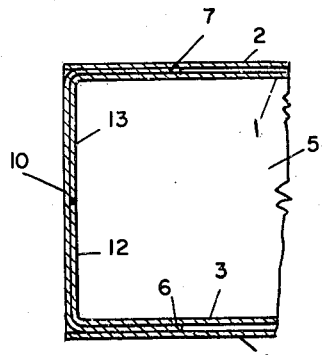
INVENTOR.
RAY F. BEEREND
BY
Oberlin, Limbach & Day.
ATTORNEYS Dec. 25, 1945.  R. F. BEEREND  2,391,767
BAKE PAN
Filed May 20, 1943  2 Sheets-Sheet 2

INVENTOR.
RAY F. BEEREND
BY
Oberlin, Limbach & Day
ATTORNEYS

Patented Dec. 25, 1945

2,391,767

UNITED STATES PATENT OFFICE 2,391,767

BAKE PAN

Ray F. Beerend, Bay Village, Ohio

Application May 20, 1943, Serial No. 487,750

2 Claims. (Cl. 99—438)

This invention relates as indicated to bake pans and more particularly to bake pans constructed of non-metallic elements, thus having the advantage not only of reduced cost but greater facility in handling and in use.

It is a principal object of my invention to provide a bake pan structure in which all of the advantages of a metal pan are retained while at the same time realizing many additional advantages which may not be secured from the conventional metallic structures.

Other objects of my invention will appear as the description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a perspective view of the two elements which when assembled in nesting relation comprise one embodiment of my invention;

Fig. 2 is a fragmentary sectional view of the upper element of the structure illustrated in Fig. 1, taken on a plane substantially indicated by the line 2—2;

Fig. 3 is a fragmentary sectional view of the structure illustrated in the lower portion of Fig. 1, taken on a plane substantially indicated by the line 3—3;

Broadly stated, my invention comprises the provision of a bake pan which comprises in combination an outer component A which is a pan member of paper-like material of sufficient strength and rigidity to be substantially self-sustaining when filled with a product such as meat loaf or bread during a normal baking operation, and component B, which comprises an inner pan member of paper-like material in which the material to be baked is directly contained.

Referring now more specifically to the drawings, and more especially to Fig. 1, there are here illustrated preferred embodiments of components A and B above identified. Component A is formed of a stiff substantially rigid paper-like material such as chip-board and is formed from a flat blank such as that illustrated in Fig. 5.

Figure 5:
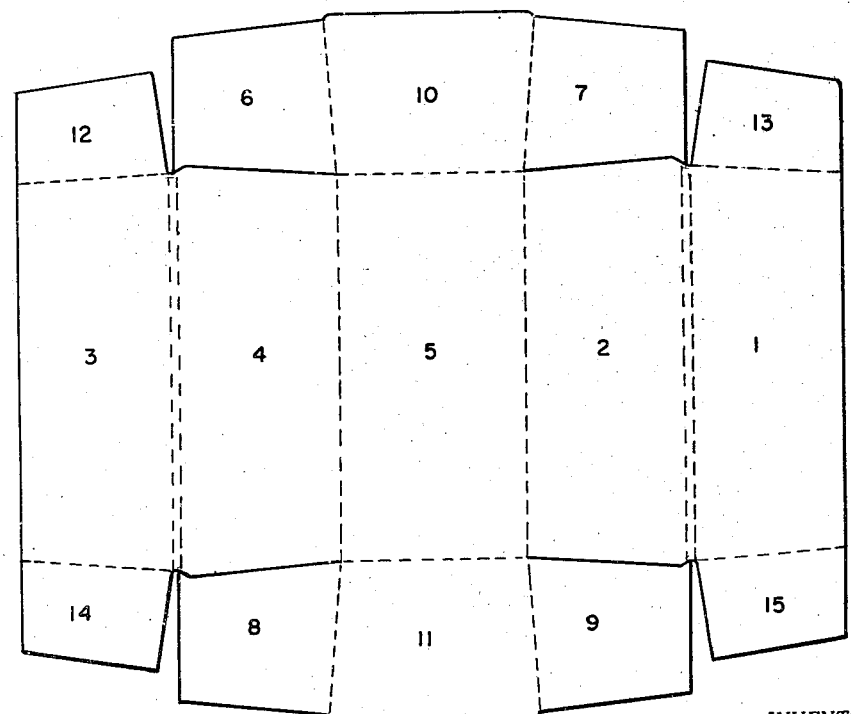
Fig. 5 is a plane view of the blank, out of which may be folded the structure illustrated in the lower portion of Fig. 1.

In Fig. 5, the dotted lines indicate score lines in the flat blank along which the same may be folded, and the heavy lines denote where the flat blank has been cut through. The various sections of the blank in Fig. 5 are numbered consecutively 1 to 15 for facility in identification, and in Fig. 1, component A has corresponding reference characters applied thereto.

In constructing component A from the flat bank illustrated in Fig. 5, components 6—10—7 and 8—11—9 are first folded to stand upright, i. e. normal to the plane of the paper. Elements 6, 7, 8 and 9 are then folded so that their lower edges coincide with the edges of element 5. Then components 2 and 4 are folded so that they stand vertically with the plane of the paper, after which components 1 and 3 are folded downwardly inside of and in overlapping relation to components 2 and 4 respectively, at the same time overlapping components 7—9 and 6—8 so that at the ends of the pan there are three thicknesses in the side walls.

The last step is to fold in the elements 12—14 and 13—15 in the manner illustrated in the drawings so that they are in terminal abutting relationship in the ends of the pan whereupon the structure is in rigid assembled relation.

As previously indicated, the blank 4 is provided so that when it is folded in a particular manner it will provide component B of Fig. 1. The blank 4 is of a relatively thin and preferably laminated material with one face thereof impregnated or similarly treated so that when that face comes in contact with the contents of the pan it will not only not contaminate such contents but also will be capable of retaining such contents which will, in most cases, consist of water, oils, fats, etc.

The blank 4 is provided with a plurality of score lines all indicated by broken lines along which the blank may be folded. It is not perforated at any place so that the pan component B formed therefrom will have its lateral confining walls imperforate.

Figure 4:
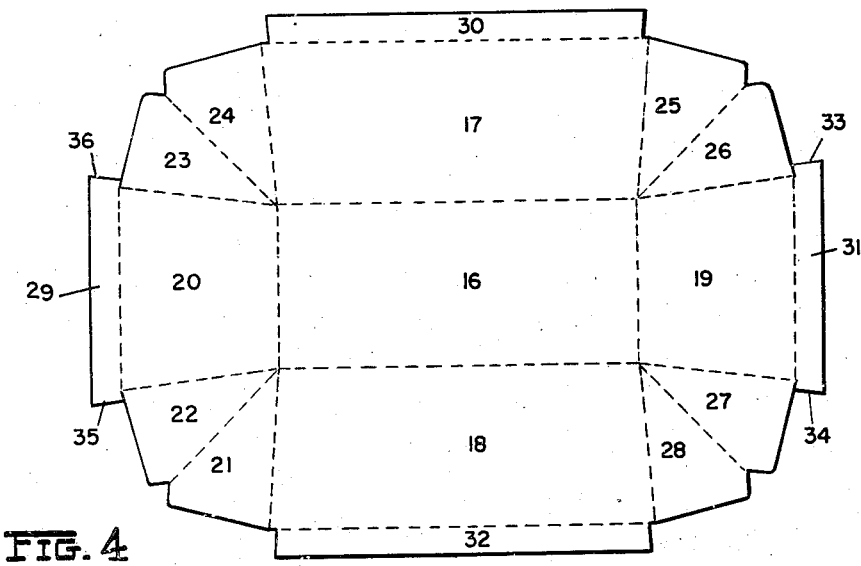
Fig. 4 is a plane view of the blank, out of which may be folded the structure illustrated in the upper part of Fig. 1.

The various portions of the blank of Fig. 4, defined by the several score lines along which the same will then be folded, are indicated by the consecutive reference characters running from 16 to 32 inclusive.

In forming the component B of Fig. 1 from the blank in Fig. 4, elements 17 to 20 inclusive are first folded upwardly so that they stand at substantially right angles to the plane of the paper. The connecting segments 21 to 28 inclusive will project outwardly from the box thus formed, and after the box or pan has been thus initially formed the segments 21 to 28 which occur as connected pairs between the adjacent elements 17 to 20 inclusive will be folded toward each other at the ends of the pan as clearly illustrated in Fig. 1. Finally, the segments 29 to 32 are bent outwardly slightly so that they will flare as illustrated in Fig. 1.

In this connection it should be noted that each of the segments 29 and 31 are, at their opposite ends, provided with tabs 33 to 36 inclusive, these tabs being cut and thus separated from the adjacent segments 26—27 and 22—23. When the segments 31 and 29 are flared as illustrated in Fig. 1, these tabs 33 will engage underneath the then adjacent ends of segments 30 and 32 locking the thus formed pan in assembled relation.

From the foregoing description, it will be observed that I have provided a bake pan structure in which the outer component A is self-supporting under the conditions encountered during the baking operation. When that component A is made of a relatively heavy grade of chip-board, the outer component A may be reused for as many as thirty times at temperatures as high as 375° F. Usually the baking operation is performed at temperatures ranging from about 180° F. to 275° F. Hence it will be observed that the outer component A is sufficiently durable to be used over and over again many many times.

The interior component B is designed, however, to be used only once. It is constructed of a light-weight material which is impervious to moisture, oils, and greases, such as are encountered when baking bread, meat loaves, and the like.

An important feature of my construction is that the inner container component B is entirely leak-proof. Thus, all of the juices developed during the baking operation are retained in the pan. In this particular, my improved construction has decided advantages as compared with conventional metal pans. When using metal pans for baking meat products and the like, the cost of the pans is such that it becomes economically feasible to remove the baked product from the pan immediately the baking operation is concluded. In this way, all of the juices and fats which are then in a liquid state are lost and generally discarded as inedible products. When, however, my improved construction is employed, the inner component B is removed immediately after the conclusion of the baking operation, and the baked product is permitted to cool therein, and in this way a large percentage of the juices otherwise lost are reabsorbed by the baked product and the oils and fats permitted to solidify on the baked product, this being a highly desirable practice.

My improved construction being formed of paper-like material has another advantage as compared with metal pans in that the rate of heat transfer through the walls is slower than with metal pans. This advantage is due not only to the material of which my construction is made but also due to the fact that each of the confining walls and bottom of the complete assembly comprises at least two separate thicknesses of the paper-like material. When using metal pans, meat loaves are generally baked with a low initial temperature on the order of about 120° F. to 175° F. in order to permit even penetration of heat through the loaf and to prevent an outer crust forming too rapidly resulting in cracked loaves due to inner expansion as the outer part of the loaf reaches the higher temperature. When using the improved construction of my invention, however, the heat transfer through the pan is slow and uniform, thus making it possible to begin the baking operation at a much higher temperature on the order of 250° F. to 275° F.

Other modes of applying the principle of the invention may be employed, change being made as regards the details described, provided the features stated in any of the following claims or the equivalent of such be employed.

I therefore particularly point out and distinctly claim as my invention:

1. A meat-cooking carton comprising an inner carton having the bottom, side and end walls presenting smooth unobstructed inner surfaces and an outer carton having a bottom and end walls integral therewith said end walls having integral infolding tabs, side walls integral with the bottom having infolding portions overlapping the infolded end tabs, said infolded side portions having infolded end tabs having the end surfaces adapted to abut and interlock when folded against the end members.

2. A meat-cooking carton comprising an inner seamless carton formed of a single sheet of paper-like material having a bottom, sides and ends, said sides and ends being connected by corner panels folded on the outward sides of the folded end panels, said side and end panels having outwardly foldable strips, and an outer carton snugly embracing said inner carton and holding the folded corner panels snugly adjacent the end panels with the edges of the end panels held snugly adjacent the side panels.

RAY F. BEEREND.